(12) United States Patent
Lee et al.

(10) Patent No.: US 7,653,313 B2
(45) Date of Patent: Jan. 26, 2010

(54) WIRELESS REMOTE ACCESS BASE STATION AND PICO-CELL SYSTEM USING THE SAME

(75) Inventors: Han-Lim Lee, Seoul (KR); Seong-Taek Hwang, Pyeongtaek-si (KR); Young-Sik Kim, Seoul (KR); Ji-Chai Jeong, Seoul (KR); Ho-Deok Jang, Seoul (KR); Sub Hur, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 490 days.

(21) Appl. No.: 11/519,613

(22) Filed: Sep. 12, 2006

(65) Prior Publication Data

US 2007/0058978 A1    Mar. 15, 2007

(30) Foreign Application Priority Data

Sep. 12, 2005    (KR) ............ 10-2005-0084725

(51) Int. Cl.
*H04B 10/00* (2006.01)

(52) U.S. Cl. ............ 398/115; 398/116; 398/118

(58) Field of Classification Search ............ 398/115, 398/116, 118, 180
See application file for complete search history.

(56) References Cited

U.S. PATENT DOCUMENTS

| 2003/0016418 A1* | 1/2003 | Westbrook et al. ...... 359/145 |
| 2004/0001719 A1* | 1/2004 | Sasaki ...... 398/115 |
| 2004/0179852 A1* | 9/2004 | Westbrook et al. ...... 398/183 |

* cited by examiner

*Primary Examiner*—Dzung D Tran
(74) *Attorney, Agent, or Firm*—Cha & Reiter, LLC

(57) ABSTRACT

A wireless remote access base station for converting a downstream optical signal to a downstream radio frequency (RF) signal, transmitting the converted downstream RF signal wirelessly, converting a received upstream RF signal to an upstream optical signal, and transmitting the upstream optical signal is provided. The remote base station includes: an electro-absorption modulator (EAM) for converting a downstream optical signal to a downstream RF signal and an upstream RF signal to an upstream optical signal; an antenna for transmitting the downstream RF signal wirelessly and outputting the upstream RF signal received wirelessly to the EAM; and an amplifier, which is located between the EAM and the antenna, amplifies the downstream RF signal and outputs the amplified downstream RF signal to the antenna.

5 Claims, 7 Drawing Sheets

WIRELESS REMOTE ACCESS BASE STATION AND PICO-CELL SYSTEM USING THE SAME

CLAIM OF PRIORITY

This application claims priority under 35 U.S.C. § 119 to an application entitled "Wireless Remote Access Base Station and Pico-Cell System Using the Same," filed in the Korean Intellectual Property Office on Sep. 12, 2005 and assigned Serial No. 2005-84725, the contents of which are incorporated herein by reference.

BACKGROUND OF THE INVENTION

1. Field of the Invention

The present invention relates generally to a wireless remote access base station converting an optical signal to a radio frequency (RF) signal and utilizing the converted RF signal for wireless communication, and in particular, to a wireless remote access base station including an electro-absorption modulator (EAM).

2. Description of the Related Art

A method of transmitting an optical signal from a central office to a relay base station and transmitting a radio frequency (RF) signal from the relay base station to each subscriber is known as a radio-over-fiber (ROF) method. A system using the ROF method is called a pico-cell system, which includes a wireless remote access base station for transmitting/receiving data by converting an optical signal to an RF signal and an RF signal to an optical signal.

FIG. 1 is a configuration of a conventional ROF type pico-cell system 100 including a wireless remote access base station 130. As shown, the pico-cell system 100 includes a wireless router 110, an optical transceiver 120 for generating a downstream optical signal and receiving an upstream optical signal, and the wireless remote access base station 130. The pico-cell system 100 can transmit a downstream RF signal to a portable digital communication device 140, such as a personal computer (PC) 142 or a personal digital assistant (PDA) including a wireless local area network (WLAN) card 141, or convert an upstream RF signal received from the portable digital communication device 140 to an upstream optical signal. The optical transceiver 120 and the wireless remote access base station 130 are linked using a downstream optical fiber 101 and an upstream optical fiber 102.

The wireless remote access base station 130 includes an electro-absorption modulator (EAM) and an antenna. The antenna receives an upstream RF signal and transmits a downstream RF signal to the portable digital communication device 140 in a wireless manner. The EAM converts an upstream RF signal received via the antenna to an upstream optical signal and transmits the converted upstream optical signal to the optical transceiver 120. The EAM also converts a downstream optical signal to a downstream RF signal and transmits the converted downstream RF signal via the antenna in a wireless manner. The EAM can operate even without applying a separate bias voltage, thereby enabling a simple wireless remote access base station structure.

However, without applying a bias voltage, the sensing characteristic of an RF signal is low, and the service coverage is limited within an area of a 1 m radius.

SUMMARY OF THE INVENTION

An object of the present invention is to substantially solve at least the above problems and/or disadvantages and to provide additional advantages, by providing a wireless remote access base station having a wireless communication coverage of more than a 20 m radius while providing loss compensation.

According to one aspect of the present invention, there is provided a wireless remote access base station for converting a downstream optical signal to a downstream radio frequency (RF) signal and transmitting the converted downstream RF signal in a wireless manner, and converting a received upstream RF signal to an upstream optical signal and transmitting the upstream optical signal. The wireless remote access base station includes: an electro-absorption modulator (EAM) for converting a downstream optical signal to a downstream RF signal and an upstream RF signal to an upstream optical signal; an antenna for transmitting the downstream RF signal in a wireless manner and outputting the upstream RF signal received in a wireless manner to the EAM; and an amplifier, which is disposed between the EAM and the antenna, amplifies the downstream RF signal and outputs the amplified downstream RF signal to the antenna.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

Figure 1:
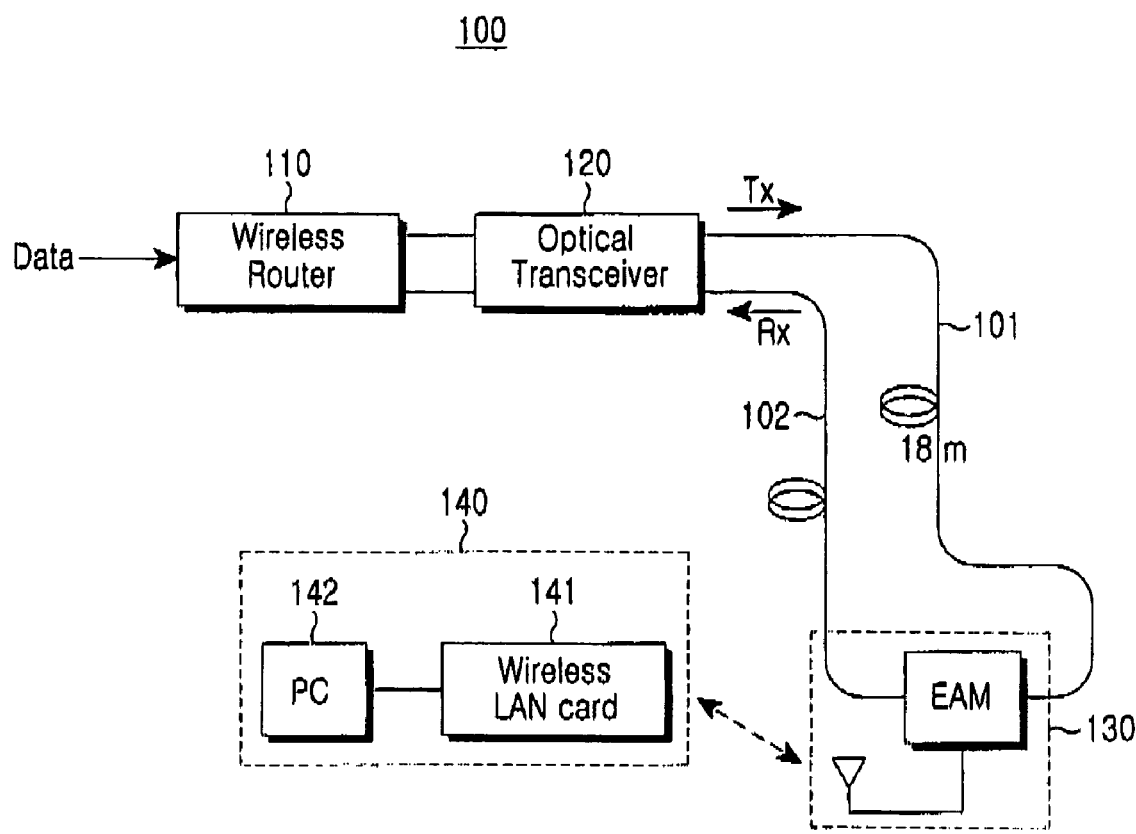
FIG. 1 is a configuration of a conventional ROF type pico-cell system including a wireless remote access base station.

Embodiments of the present invention will be described herein below with reference to the accompanying drawings. In the drawings, the same or similar elements are denoted by the same reference numerals even though they are depicted in different drawings. For the purposes of clarity and simplicity, well-known functions or constructions are not described in detail as they would obscure the invention in unnecessary detail.

Figure 2:
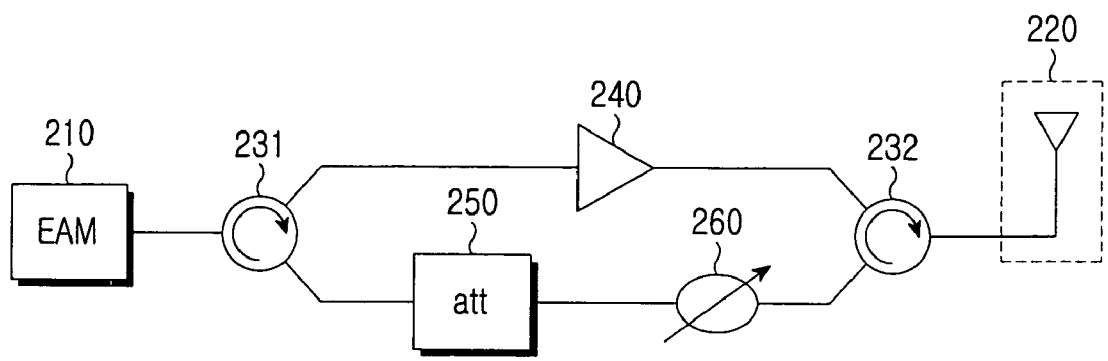
FIG. 2 is a configuration of a wireless remote access base station according to a first embodiment of the present invention.

FIG. 2 is a configuration of a wireless remote access base station 200 according to a first embodiment of the present invention. As shown, the wireless remote access base station 200 includes an electro-absorption modulator (EAM) 210 for converting a downstream optical signal to a downstream RF signal and an upstream RF signal to an upstream optical signal, an antenna 220 for transmitting the downstream RF signal wirelessly and forwarding the received upstream RF signal received wirelessly to the EAM 210, an amplifier 240, first and second circulators 231 and 232, an attenuator 250, and a filter 260.

The amplifier 240 is located between the first and second circulators 231 and 232, electrically amplifies the downstream RF signal input through the first circulator 231, and outputs the amplified downstream RF signal to the antenna 220 via the second circulator 232.

The first circulator 231 outputs the downstream RF signal to the antenna 220 and outputs the upstream RF signal received through the antenna 220 to the EAM 210. The second circulator 232 outputs the downstream RF signal amplified by the amplifier 240 to the antenna 220 and outputs the upstream RF signal received through the antenna 220 to the filter 260.

The attenuator 250 is located between the filter 260 and the first circulator 231. The attenuator 250 and the filter 260 suppress the occurrence of oscillation in the first and second circulators 231 and 232 and the amplifier 240.

Figure 3:
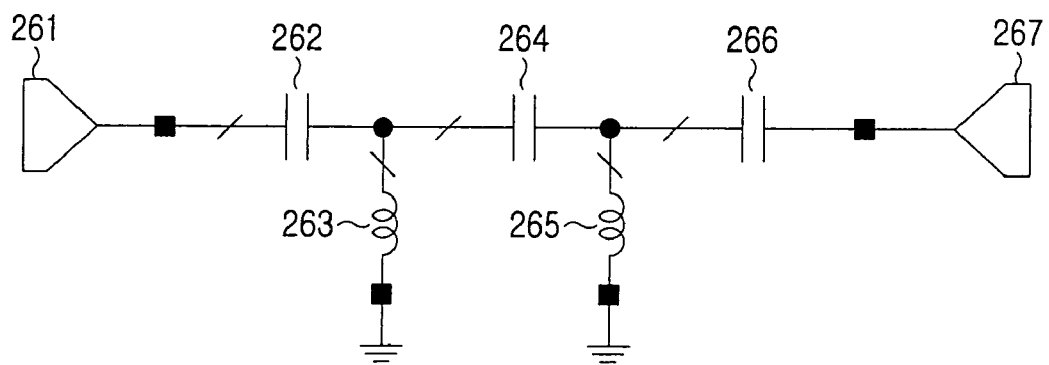
FIG. 3 is a configuration of the filter of FIG. 2.

FIG. 3 is a configuration of the filter 260 of FIG. 2. As shown, the filter 260, which is located between the attenuator 250 and the second circulator 232, includes first and second ports 261 and 267, first to third capacitors 262, 264, and 266, first and second inductors 263 and 265.

Each of the first and second ports 261 and 267 has impedance of 50 Ω, the first port 261 is a signal input port, and the second port 267 is a signal output port.

The first to third capacitors 262, 264, and 266 are connected in series between the first and second ports 261 and 267. One electrode of the first inductor 263 is connected between the first and second capacitors 262 and 264, and the other is grounded. One electrode of the second inductor 265 is connected between the second and third capacitors 264 and 266, and the other is grounded.

Figure 4:
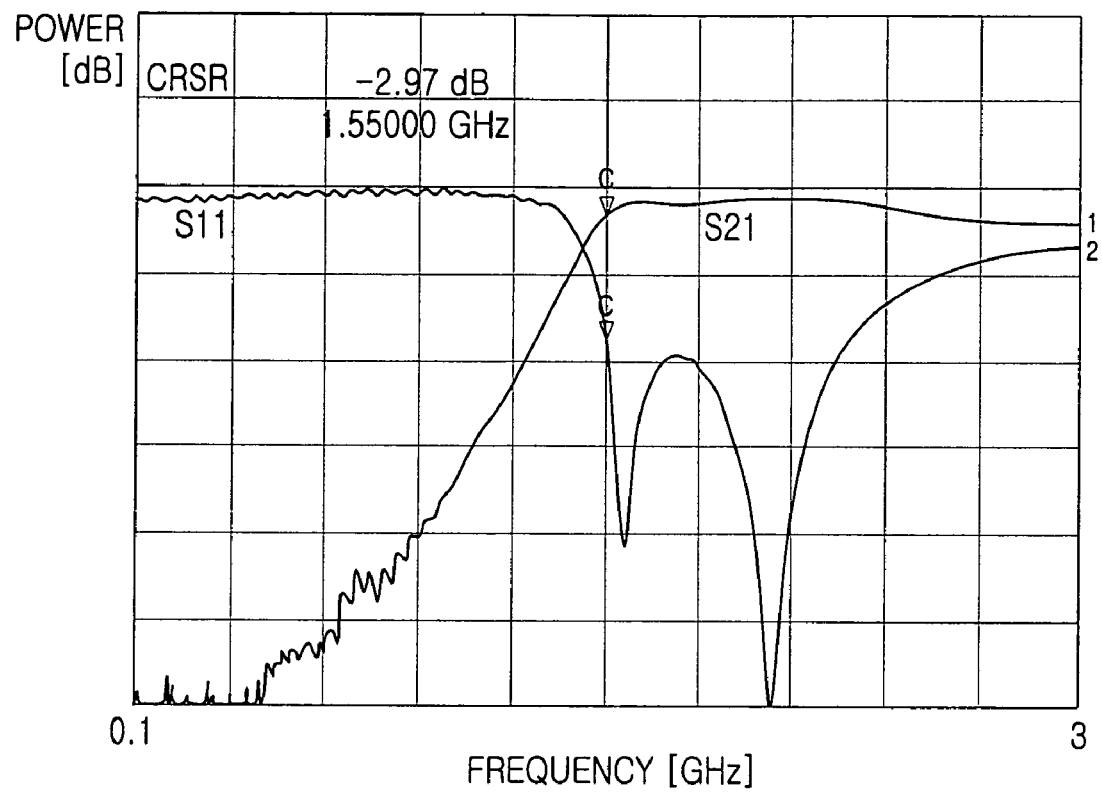
FIG. 4 is a diagram showing an S-filter characteristic of the filter of FIG. 3.

FIG. 4 is a diagram showing an S-filter characteristic of the filter 260 of FIG. 3. The graphs illustrated in FIG. 4 are measured by a network analyzer. The x-axis denotes a measuring frequency band, and the y-axis denotes the magnitude of a signal measured in each frequency band.

The graph S21 denotes the magnitude of a signal input through the first port 261 and output through the second port 267. The graph S11 denotes the magnitude of a signal input through the first port 261 and reflected to the first port 261 instead of being output through the second port 267.

Figure 5A:
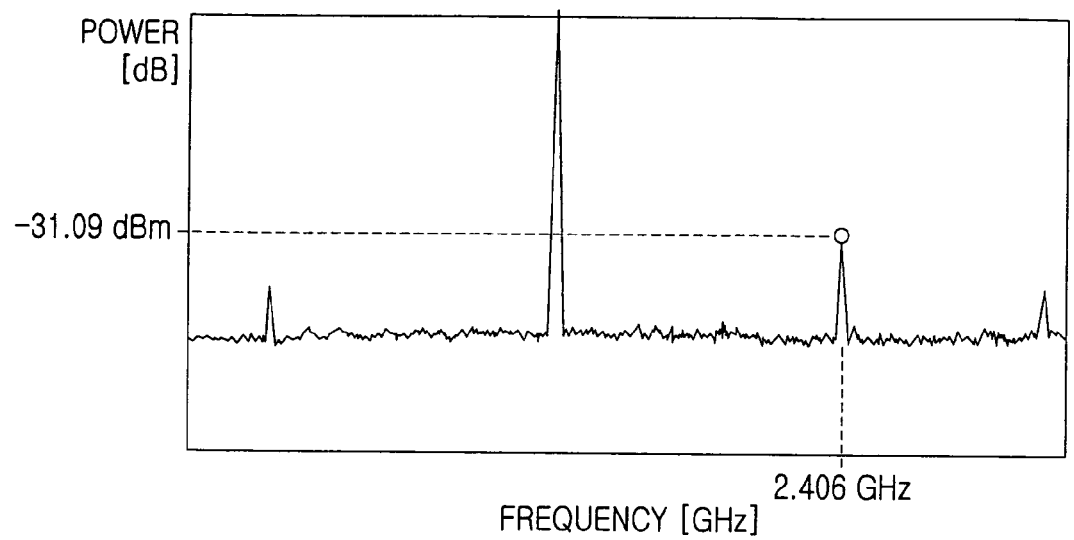
FIGS. 5A and 5B are spectral diagrams for explaining output characteristics of the wireless remote access base station of FIG. 2 toward upstream and downstream links.
Figure 5B:
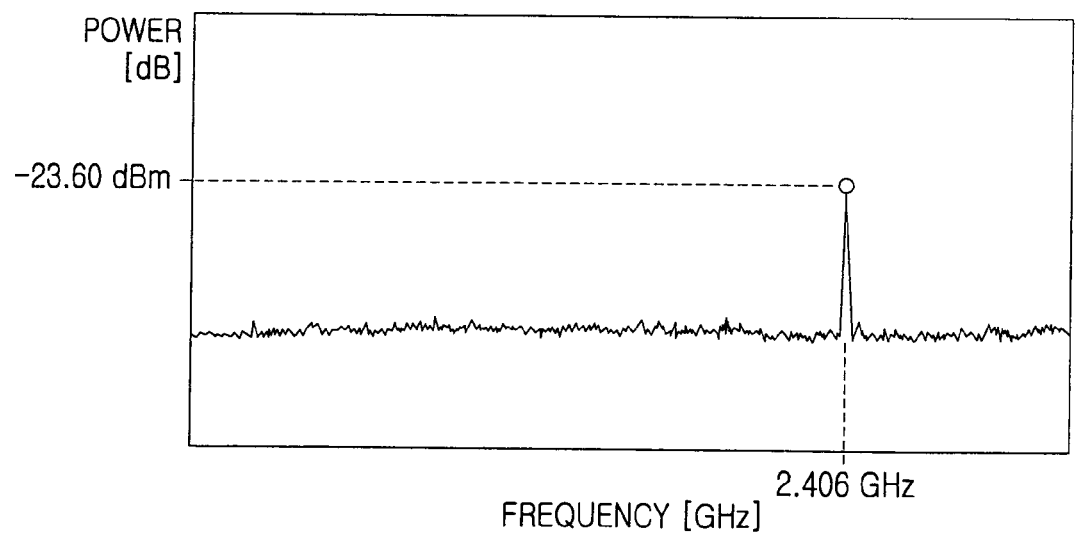

FIGS. 5A and 5B are spectral diagrams illustrating the output characteristics of the wireless remote access base station 200 of FIG. 2 toward upstream and downstream links. In particular, FIGS. 5A and 5B show the spectra measured in the EAM 210 when a downstream RF signal of –50 dBm is input to the wireless remote access base station 200.

In details, FIG. 5A shows a spectrum of the signal when only the filter 260 is used, and FIG. 5B shows a spectrum of the signal when the magnitude attenuation of 8 dB is applied to the wireless remote access base station 200 by using the attenuator 250. According to FIG. 5B, a gain of 26 dB can be obtained in a state where oscillation is suppressed.

The results obtained by measuring a serviceable radius through a ping test when the wireless remote access base station 200 according to the first embodiment is applied to the pico-cell system illustrated in FIG. 1 are as follows. A packet lost ratio in a 12 m radius is 0% when a bias voltage is not applied to the EAM 210, and a packet lost ratio in a 20 m radius is 0% when a bias voltage of –1V is applied to the EAM 210. A radio frequency used for the measurement is 2.4 GHz.

Figure 6:
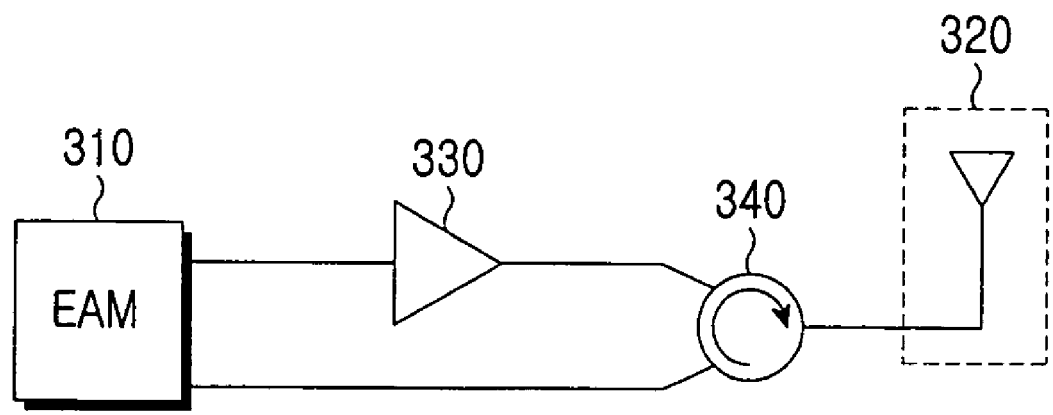
FIG. 6 is a configuration of a wireless remote access base station according to a second embodiment of the present invention.

FIG. 6 is a configuration of a wireless remote access base station 300 according to a second embodiment of the present invention. As shown, the wireless remote access base station 300 includes an EAM 310, an amplifier 330, a circulator 340, and an antenna 320.

The EAM 310 photoelectric converts an input downstream optical signal to a downstream RF signal and outputs the photoelectric converted downstream RF signal to the amplifier 330. The amplifier 330 amplifies the downstream RF signal and outputs the amplified downstream RF signal to the circulator 340.

The circulator 340 outputs the downstream RF signal input from the amplifier 330 to the antenna 320 and outputs an upstream RF signal input from the antenna 320 to the EAM 310.

The wireless remote access base station 300 according to the second embodiment can prevent the occurrence of oscillation in the amplifier 330 by inputting and outputting upstream and downstream RF signals through independent paths, respectively.

Figure 7A:
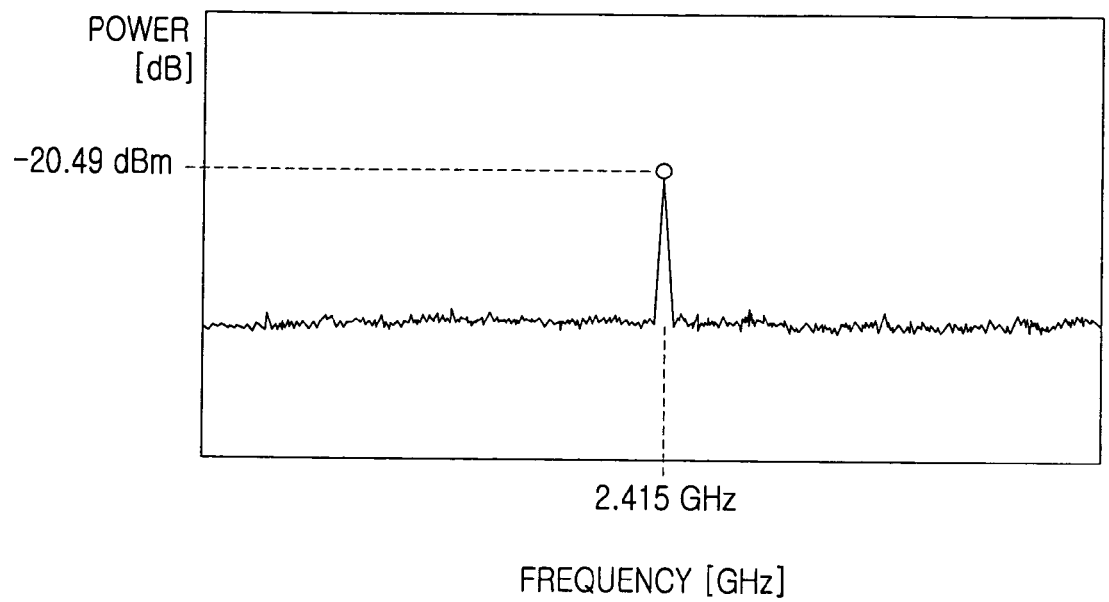
FIGS. 7A and 7B are spectral diagrams for explaining output characteristics of upstream and downstream links of the wireless remote access base station of FIG. 6.
Figure 7B:
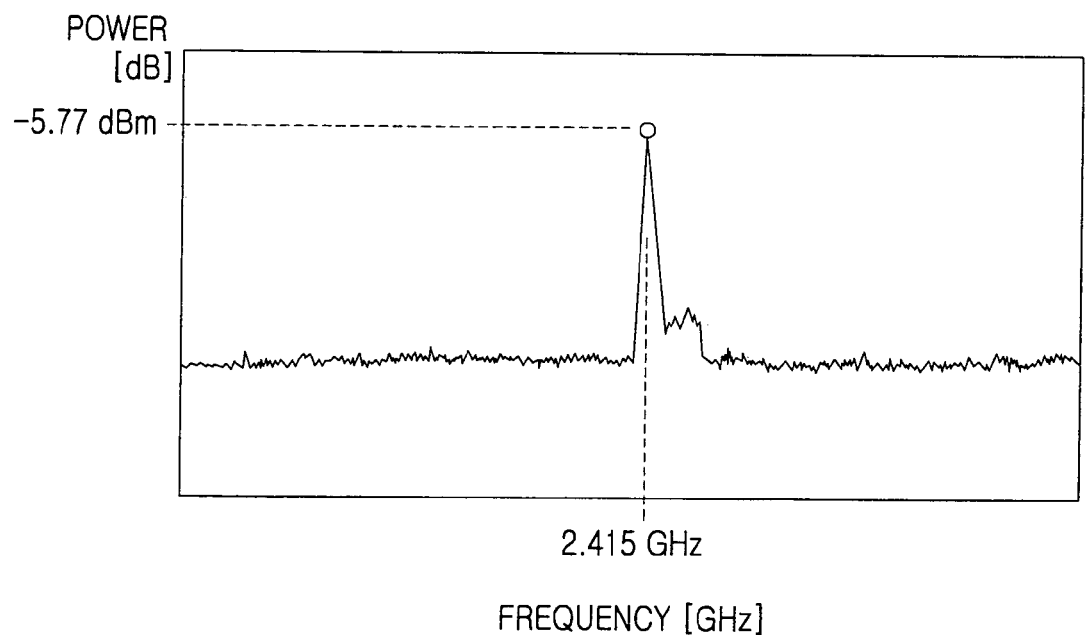

FIGS. 7A and 7B are spectral diagrams illustrating the output characteristics of upstream and downstream links of the wireless remote access base station 300 of FIG. 6. FIGS. 7A and 7B are results measured under the same conditions of FIGS. 5A and 5B and show spectral variations of a signal measured in the EAM 310 when a signal having the magnitude of –50 dBm at the frequency of 2.4 GHz is applied to the wireless remote access base station 300. In particular, FIG. 7A shows a spectrum of the signal when a bias voltage is not applied to the EAM 310, and FIG. 7B shows a spectrum of the signal when a bias voltage of –2V is applied to the EAM 310. According to FIG. 7B, a gain of 44 dB can be obtained.

Figure 8:
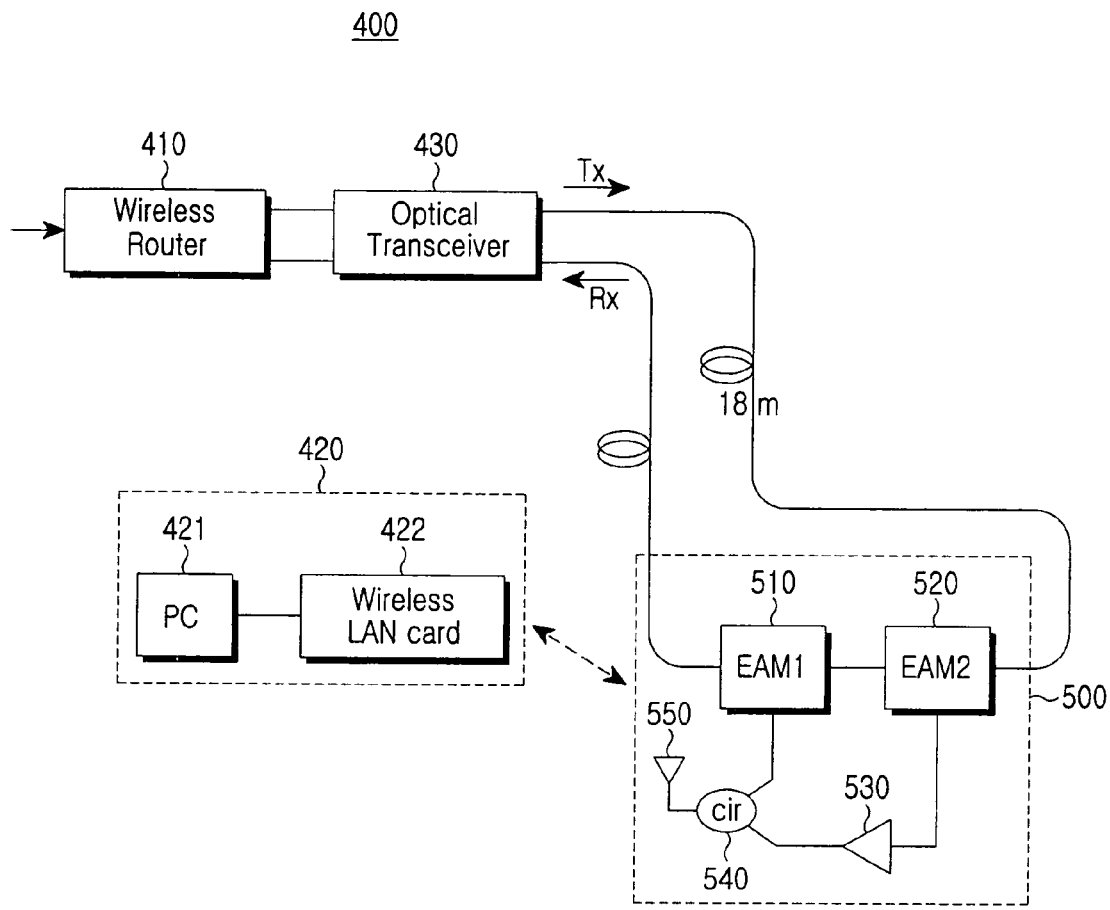
FIG. 8 is a configuration of an ROF type pico-cell system according to a third embodiment of the present invention.

FIG. 8 is a configuration of an ROF type pico-cell system 400 according to a third embodiment of the present invention. As shown, the pico-cell system 400 includes a wireless router 410 for generating downstream data and detecting upstream data, an optical transceiver 430 for modulating the downstream data into a downstream optical signal and outputting an upstream optical signal to the wireless router 410, a wireless communication device 420 for generating an upstream RF signal and detecting data from a received downstream RF signal, a wireless remote access base station 500, and first and second optical fibers Rx and Tx for linking the optical transceiver 430 and the wireless remote access base station 500.

The wireless communication device 420 can include a portable digital communication terminal, such as a personal computer (PC) 421 or a PDA including a WLAN card 422, and perform a duplex wireless communication by receiving a downstream RF signal and generating an upstream RF signal.

The wireless remote access base station 500 includes first and second EAMs 510 and 520, an antenna 550, a circulator 540, and an amplifier 530.

The first EAM 510 electrooptically converts the upstream RF signal to an upstream optical signal and transmits the electrooptically converted upstream optical signal to the optical transceiver 430 through the first optical fiber Rx. The second EAM 520 photoelectric converts the downstream optical signal received through the second optical fiber Tx to a downstream RF signal and outputs the photoelectric converted downstream RF signal to the amplifier 530.

The amplifier 530 amplifies the downstream RF signal input from the second EAM 520 and outputs the amplified downstream RF signal to the circulator 540, and the circulator 540 outputs the input downstream RF signal to the antenna 550.

The antenna 550 transmits the downstream RF signal to the wireless communication device 420 wirelessly and outputs the upstream RF signal received wirelessly to the circulator 540. The circulator 540 outputs the input upstream RF signal to the first EAM 510.

Having thus described embodiments of the present invention, it should be apparent to those skilled in the art that a low light sensing characteristic of an EAM can be improved, and simultaneously, the coverage radius of a wireless communication service can be increased. In addition, since a wireless remote access base station can operate by applying a low or no bias voltage to the EAM, unnecessary oscillation in an amplifier can be suppressed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wireless remote access base station for converting a downstream optical signal to a downstream radio frequency (RF) signal and transmitting the converted downstream RF signal wirelessly, and converting a received upstream RF signal to an upstream optical signal and transmitting the upstream optical signal, comprising:
   an electro-absorption modulator (EAM) for converting the downstream optical signal to the downstream RF signal and the upstream RF signal to the upstream optical signal;
   an antenna for transmitting the downstream RF signal wirelessly and outputting the upstream RF signal received wirelessly to the EAM; and
   an amplifier, disposed between the EAM and the antenna, amplifies the downstream RF signal and outputs the amplified downstream RF signal to the antenna;
   a first circulator for outputting the downstream RF signal to the antenna and outputting the upstream RF signal input from the antenna to the EAM;
   a second circulator for outputting the downstream RF signal amplified by the amplifier to the antenna and outputting the upstream RF signal input from the antenna to the first circulator; and
   a filter disposed between the first circulator and the second circulator;
wherein the filter comprises:
   a first port for inputting the downstream RF signal;
   a second port for outputting the downstream RF signal;
   first to third capacitors coupled in series between the first port and the second port;
   a first inductor, one electrode of which is coupled between the first capacitor and the second capacitor and the other electrode is grounded; and
   a second inductor, one electrode of which is coupled between the second capacitor and the third capacitor and the other electrode is grounded.

2. A wireless remote access base station for converting a downstream optical signal to a downstream radio frequency (RF) signal and transmitting the converted downstream RF signal wirelessly, and converting a received upstream RF signal to an upstream optical signal and transmitting the upstream optical signal, comprising;
   an electro-absorption modulator (EAM) for converting the downstream optical signal to the downstream RF signal and the upstream RF signal to the upstream optical signal;
   an antenna for transmitting the downstream RF signal wirelessly and outputting the upstream RF signal received wirelessly to the EAM; and
   an amplifier, disposed between the EAM and the antenna, amplifies the downstream RF signal and outputs the amplified downstream RF signal to the antenna;
   a first circulator for outputting the downstream RF signal to the antenna and outputting the upstream RF signal input from the antenna to the EAM:
   a second circulator for outputting the downstream RF signal amplified by the amplifier to the antenna and outputting the upstream RF signal input from the antenna to the first circulator;
   an attenuator disposed between the first circulator and the second circulator; and
   a filter disposed between the attenuator and the second circulator;
wherein the filter comprises:
   a first port for inputting the downstream RF signal;
   a second port for outputting the downstream RF signal;
   first to third capacitors coupled in series between the first port and the second port;
   a first inductor, one electrode of which is coupled between the first capacitor and the second capacitor and the other electrode is grounded; and
   a second inductor, one electrode of which is coupled between the second capacitor and the third capacitor and the other electrode is grounded.

3. A wireless remote access base station for modulating a downstream optical signal to a downstream radio frequency (RF) signal and transmitting the converted downstream RF signal wirelessly, and converting a received upstream RF signal to an upstream optical signal and transmitting the upstream optical signal, comprising:
   a first electro-absorption modulator (EAM) for converting the upstream RF signal to the upstream optical signal;
   a second EAM for converting the downstream optical signal to the downstream RF signal;
   an antenna for transmitting the downstream RF signal wirelessly and outputting the upstream RF signal received wirelessly to the first EAM;
   an amplifier, disposed between the second EAM and the antenna, amplifies the downstream RF signal, and outputs the amplified downstream RF signal to the antenna; and
   a first circulator for outputting the downstream RF signal amplified by the amplifier to the antenna and outputting the upstream RF signal input from the antenna to the first EAM;
   a second circulator for outputting the downstream RF signal amplified by the amplifier to the antenna and outputting the upstream RF signal input from the antenna to the first circulator;
   an attenuator disposed between the first circulator and the second circulator; and
   a filter disposed between the attenuator and the second circulator;
wherein the filter comprises:
   a first port for inputting the downstream RF signal;
   a second port for outputting the downstream RF signal;
   first to third capacitors coupled in series between the first port and the second port;
   a first inductor, one electrode of which is coupled between the first capacitor and the second capacitor and the other electrode is grounded; and
   a second inductor, one electrode of which is coupled between the second capacitor and the third capacitor and the other electrode is grounded.

4. A pico-cell system comprising:
a wireless router for generating downstream data and detecting upstream data;
an optical transceiver for modulating the downstream data into a downstream optical signal and outputting an upstream optical signal to the wireless router;
a wireless communication device for generating an upstream radio frequency (RF) signal and detecting data from a received downstream RF signal; and
a wireless remote access base station for converting the upstream RF signal received from the wireless communication device to the upstream optical signal, converting the downstream optical signal received from the optical transceiver to the downstream RF signal, and inputting and outputting the upstream and downstream RF signals through respective paths;
wherein the wireless remote access base station comprises:
a first electro-absorption modulator (EAM) for electrooptically converting the upstream RF signal to an upstream optical signal and transmitting the electrooptically converted upstream optical signal to the optical transceiver;
a second EAM for photoelectric converting the downstream optical signal to the downstream RF signal;
an amplifier for amplifying the downstream RF signal input form the second EAM;
an antenna for transmitting the downstream RF signal wirelessly and receiving the upstream RF signal wirelessly; and
a first circulator for outputting the downstream RF signal amplified by the amplifier to the antenna and outputting the upstream RF signal input from the antenna to the first EAM;
a second circulator for outputting the downstream RF signal amplified by the amplifier to the antenna and outputting the upstream RF signal input from the antenna to the first circulator;
an attenuator disposed between the first circulator and the second circulator; and
a filter disposed between the attenuator and the second circulator;
wherein the filter comprises:
a first port for inputting the downstream RF signal;
a second port for outputting the downstream RF signal;
first to third capacitors coupled in series between the first port and the second port;
a first inductor, one electrode of which is coupled between the first capacitor and the second capacitor and the other electrode is grounded; and
a second inductor, one electrode of which is coupled between the second capacitor and the third capacitor and the other electrode is grounded.

5. The pico-cell method of claim 4, further comprising:
a first optical fiber for downstream linking the optical transceiver and the wireless remote access base station; and
a second optical fiber for upstream linking the optical transceiver and the wireless remote access base station.

* * * * *

UNITED STATES PATENT AND TRADEMARK OFFICE
CERTIFICATE OF CORRECTION

PATENT NO. : 7,653,313 B2 Page 1 of 1
APPLICATION NO. : 11/519613
DATED : January 26, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 626 days.

Signed and Sealed this

Twenty-third Day of November, 2010

David J. Kappos
*Director of the United States Patent and Trademark Office*